United States Patent
Chen

(10) Patent No.: US 8,250,958 B2
(45) Date of Patent: Aug. 28, 2012

(54) ELECTRIC SAW DEVICE

(75) Inventor: Chung-Chi Eric Chen, Richmond (CA)

(73) Assignee: Newstar (Asia) Ltd, Tsuen Wan (HK)

( * ) Notice: Subject to any disclaimer, the term of this patent is extended or adjusted under 35 U.S.C. 154(b) by 632 days.

(21) Appl. No.: 12/357,100

(22) Filed: Jan. 21, 2009

(65) Prior Publication Data

US 2010/0180454 A1    Jul. 22, 2010

(51) Int. Cl.
*B23D 61/02*    (2006.01)
*B23D 45/10*    (2006.01)
*B27B 5/29*    (2006.01)
*B27B 33/08*    (2006.01)

(52) U.S. Cl. ............... 83/837; 83/664; 83/666; 30/265; 30/267; 30/276; 30/369; 30/502; 30/503

(58) Field of Classification Search ............. 30/369, 30/265, 276, 347, 501–503.5; 83/664, 792, 83/824, 825, 666, 676, 835, 837; 125/13.01, 125/15

See application file for complete search history.

(56) References Cited

U.S. PATENT DOCUMENTS

| | | | | |
|---|---|---|---|---|
| 1,885,754 A | * | 11/1932 | Nachtigall | 30/267 |
| 2,555,428 A | * | 6/1951 | Tuttle | 30/369 |
| 3,618,304 A | * | 11/1971 | Hundhausen | 56/16.9 |
| 4,584,770 A | * | 4/1986 | Sabol | 30/267 |
| 5,174,099 A | * | 12/1992 | Matsuura | 56/12.1 |
| 6,105,351 A | * | 8/2000 | Itoh | 56/235 |
| 6,135,004 A | * | 10/2000 | Gebelius | 83/835 |
| 6,962,147 B2 | * | 11/2005 | Hamilton | 125/13.01 |
| 7,533,665 B2 | * | 5/2009 | Hamilton | 125/13.01 |
| 8,033,206 B2 | * | 10/2011 | Ericsson | 83/835 |
| 2003/0000363 A1 | * | 1/2003 | Hofmann et al. | 83/837 |
| 2004/0182217 A1 | * | 9/2004 | Ericsson | 83/835 |
| 2010/0058916 A1 | * | 3/2010 | Ericsson | 83/835 |
| 2010/0212472 A1 | * | 8/2010 | Ericsson | 83/848 |

FOREIGN PATENT DOCUMENTS

WO    WO 02/092298    * 11/2002

* cited by examiner

*Primary Examiner* — Clark F. Dexter
(74) *Attorney, Agent, or Firm* — WPAT., P.C.; Justin King

(57) ABSTRACT

An electric saw device includes a first saw blade and a second saw blade. The first and the second saw blades are respectively driven by a small transmission shaft and a large transmission shaft to rotate in opposite directions. A round rib is disposed on an inner end surface of the first saw blade, and at least three recessed holes are arranged in a top end surface of the round rib at equal angle intervals. A steel ball is accommodated in each of the recessed holes, and protrudes out of the recessed hole. Protruding ends of the steel balls urge against an inner surface of the second saw blade, so as to limit a distance between the first saw blade and the second saw blade, and form a rolling friction when the first and the second saw blade rotate in the opposite directions.

6 Claims, 8 Drawing Sheets

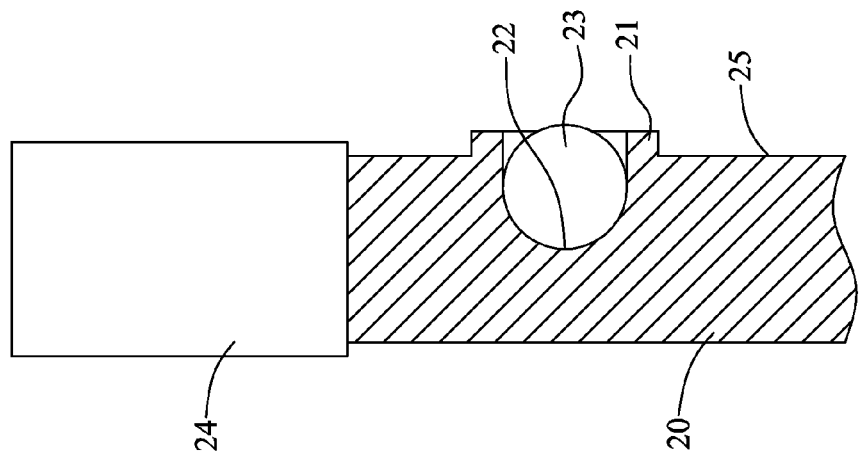
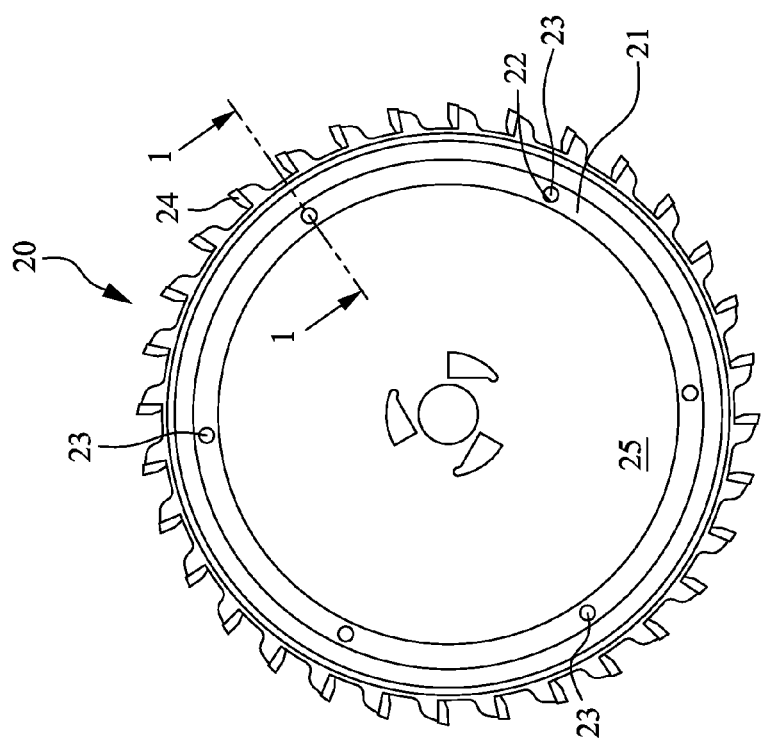
FIG.5B
FIG.5A

ELECTRIC SAW DEVICE

BACKGROUND OF THE INVENTION

1. Field of Invention

The present invention relates to an electric saw device having two saw blades, which realizes a rolling friction between the two saw blades to reduce a frictional force, and uses a key connection between transmission shafts of the saw blades and a power output shaft to improve stability of the connection.

2. Related Art

In an electric saw device having two saw blades, a first saw blade and a second saw blade are driven to rotate simultaneously in opposite directions to saw a work piece. FIG. 1a is a structural view of two saw blades of the prior art. As shown in FIG. 1a, blade heads 42 and 43 of the first and the second saw blades 40 and 41 are in contact with each other. In a cutting process, the blade heads 42 and 43 may generate a high temperature due to the contact friction. Further, the blade heads 42 and 43 of the two saw blades 40 and 41 may collide with each other easily, so the blade heads 42 and 43 will fall off or be broken, which shortens the life of the saw blades 40 and 41.

In the cutting process of the two saw blades 40 and 41 shown in FIG. 1a, the first and the second saw blades 40 and 41 may be slightly softened due to the heat generated in the friction. Further, the first and the second saw blades 40 and 41 may expand slightly due to the resistance in the cutting, and a distance between the blade heads 42 and 43 of the first and the second saw blades 40 and 41 will increase slightly, so a cut piece 44 may be clamped between the first and the second saw blades 40 and 41 easily, as shown in FIG. 1b. Meanwhile, a width of the cutting line of the saw blades 40 and 41 will increase, which influences the cutting precision. When the distance between the blade heads 42 and 43 of the first and the second saw blades 40 and 41 becomes greater, the problem of the cut piece between the saw blades will become more serious, which may eventually make a motor become useless because the motor is burned due to overload.

FIG. 2a shows a structure for a pair of saw blades, which solves the problems that the cut piece 44 may be clamped between the saw blades 40 and 41 easily shown in FIGS. 1a and 1b and that the blade heads 42 and 43 may be damaged easily. As shown in FIG. 2a, in the structure for a pair of saw blades, a circular rib 55 is disposed on a second saw blade 51, which urges against an inner surface 54 of a first saw blade 50, so as to limit the distance between the two saw blades 50 and 51. The rib 55 keeps a safe distance (0.03 mm) that allows normal operation between blade heads 52 and 53 of the two saw blades 50 and 51. Further, the rib 55 prevents the cut piece from being clamped between the two saw blades 50 and 51.

When the two saw blade 50 and 51 perform the cutting, heat is generated because of the friction between the rib 55 and the first saw blade 50, such that the first saw blade 50 is softened, and the cutting precision is lowered. Further, after a period of use, the rib 55 will be worn (as shown in FIG. 2b), or the first saw blade 50 will be worn (as shown in FIG. 2c). When the worn size is equal to or greater than the distance (0.03 mm) between the blade heads 52 and 53 of the two saw blades 50 and 51, the blade heads 52 and 53 may collide with each other, such that the electric saw device cannot operate normally. At this time, the saw blades 50 and 51 must be replaced.

Referring to FIG. 3, the first saw blade 50 of the electric saw device is driven by a small transmission shaft 60, which is screwed to a power output shaft 61. Further, a fixing screw 62 is screwed to the small transmission shaft 61, so as to tightly fix first the saw blade 50. Meanwhile, the second saw blade 51 is fixed to a large transmission shaft 63.

The power output shaft 61 is tightly connected to the small transmission shaft 60 through threads, so a tilt is inevitable between the small transmission shaft 60 and the power output shaft 61, which makes the saw blades 50 and 51 wiggle, jump, or even damage the saw teeth after assembly. The fixing screw 62 has only 1.5 threads, which are too few. Besides, as the fixing is based on the threads, a secondary tilt may occur. Therefore, the problems that the saw blades 50 and 51 wiggle, jump, or damage the saw teeth become more serious, thus resulting in an unstable current and overload of the electric motor, and shortening the service life of the electric motor.

A locking direction of the small transmission shaft 60 makes the small transmission shaft 60 become loose in operation. Therefore, a super glue must be applied at the connection of the power output shaft 61 and the small transmission shaft 60 to fix them. The results are as follows.

1. The small transmission shaft 60 and the power output shaft 61 cannot be disconnected. The entire machine head must be replaced when some parts are damaged and need to be repaired.

2. When the saw blades 50 and 51 are disassembled and replaced, if the torque to loosen the fixing screw 62 is greater than 30 N, the connection fixed by the super glue may become loose or even break under the torque, so the small transmission shaft 60 and the saw blade 50 get loose at the same time.

SUMMARY OF THE INVENTION

The present invention is directed to an electric saw device, which has two saw blades, and realizes a rolling friction between the two saw blades to reduce a frictional force, such that the saw blades are not softened because of an acute temperature rise, and a cut piece is not easily clamped between the saw blades, so as to improve a cutting precision.

The present invention is further directed to an electric saw device, in which a key connection structure is used to connect a power output shaft of the electric saw device and a small transmission shaft, so as to ensure that the saw blades do not tilt after installation nor wiggle, jump, or damage saw teeth in use.

The present invention is still further directed to a structure for fixing a transmission shaft of a first saw blade of an electric saw device, in which the transmission shaft does not become loose when the saw blades are disassembled, so as to facilitate maintenance and parts replacement.

The electric saw device of the present invention includes a first saw blade and a second saw blade. The first and the second saw blade are respectively driven by a small transmission shaft and a large transmission shaft to rotate in opposite directions. A round rib is disposed on an inner end surface of the first saw blade, and at least three recessed holes are arranged in a top end surface of the round rib at equal angle intervals. A steel ball is accommodated in each of the recessed holes, and protrudes out of the recessed hole. Protruding ends of the steel balls urge against an inner surface of the second saw blade, so as to limit a distance between the first saw blade and the second saw blade, and form a rolling friction when the first and the second saw blades rotate in the opposite directions through rolling of the steel balls.

In the electric saw device, a first round protruding wall and a second round protruding wall are disposed on an inner surface of the second saw blade. An inner diameter of the first round protruding wall is slightly greater than an outer diameter of the round rib of the first saw blade, and an outer diameter of the second round protruding wall is slightly smaller than an inner diameter of the round rib of the first saw blade. The first and the second round protruding walls prevent powder or small particles generated in cutting from entering a contact surface between the steel balls and the second saw blade.

In the electric saw device of the present invention, the small transmission shaft is driven to rotate by a power output shaft. An axial hole is arranged in the small transmission shaft, and a front end of the power output shaft is inserted in the axial hole. A contact surface between the power output shaft and the small transmission shaft is in a form that axial ribs are inserted in and tightly fitted with key ways. Further, a fixing screw is screwed in a tapped hole preset in a front end surface of the power output shaft, so as to tightly fix the first saw blade to the small transmission shaft, and prevent the small transmission shaft from getting loose.

BRIEF DESCRIPTION OF THE DRAWINGS

The present invention will become more fully understood from the detailed description given herein below for illustration only, and thus are not limitative of the present invention, and wherein:

FIG. 1b is a schematic view of the state in which a cut piece is clamped between the saw blades of FIG. 1a.

FIG. 5a is a front view of the first saw blade of FIG. 4.

FIG. 5b is an enlarged view of a cross section taken along 1-1 in FIG. 5a.

FIG. 6b is an enlarged view of a cross section taken along 2-2 in FIG. 5a.

DETAILED DESCRIPTION OF THE INVENTION

To solve the problems of the cutting precision and life of the two saw blades, the fundamental method is to reduce the frictional force so that the saw blades do not deform because of high temperature, and to prevent the saw blades from tilting after assembly. Therefore, the inventor proposes the present invention. The present invention reduces the frictional force between the two saw blades to prevent a cutting piece from being sandwiched between the saw blades, and makes the saw blades be assembled stably, so as to improve the cutting precision and prolong the life of the saw blades. The structure and efficacy of the present invention will be illustrated in detail in the following with reference to the accompanying drawings.

Figure 1A:
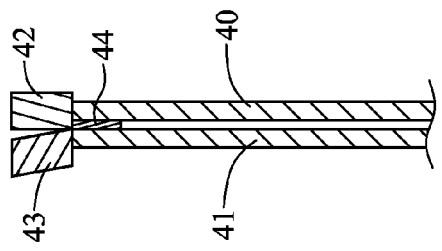
FIG. 1a is a schematic structural view of conventional saw blades.
Figure 1B:
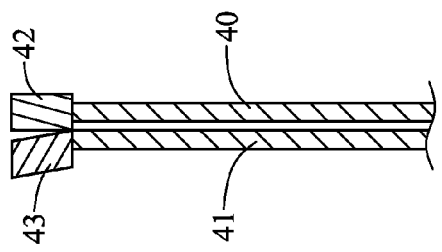
Figure 2A:
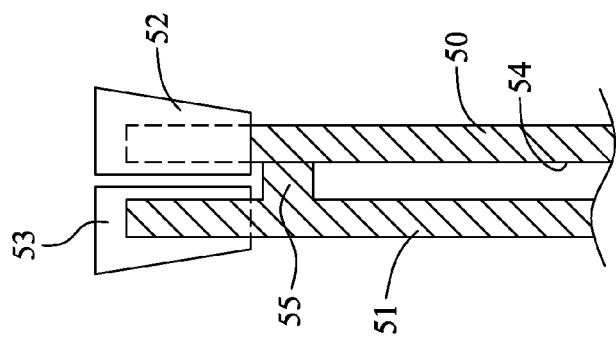
FIG. 2a is a schematic view of a structure for a pair of saw blades disclosed in Patent WO 08/057028.
Figure 2B:
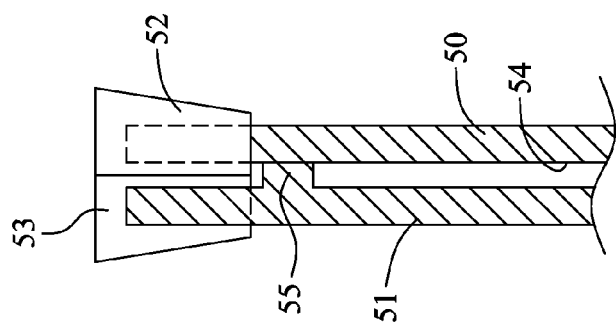
FIG. 2b is a schematic view of the state in which the rib on the saw blade of FIG. 2a is worn.
Figure 2C:
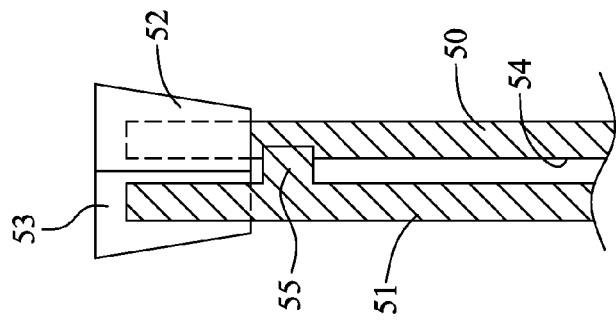
FIG. 2c is a schematic view of the state in which one of the saw blades of FIG. 2a is worn.
Figure 3:
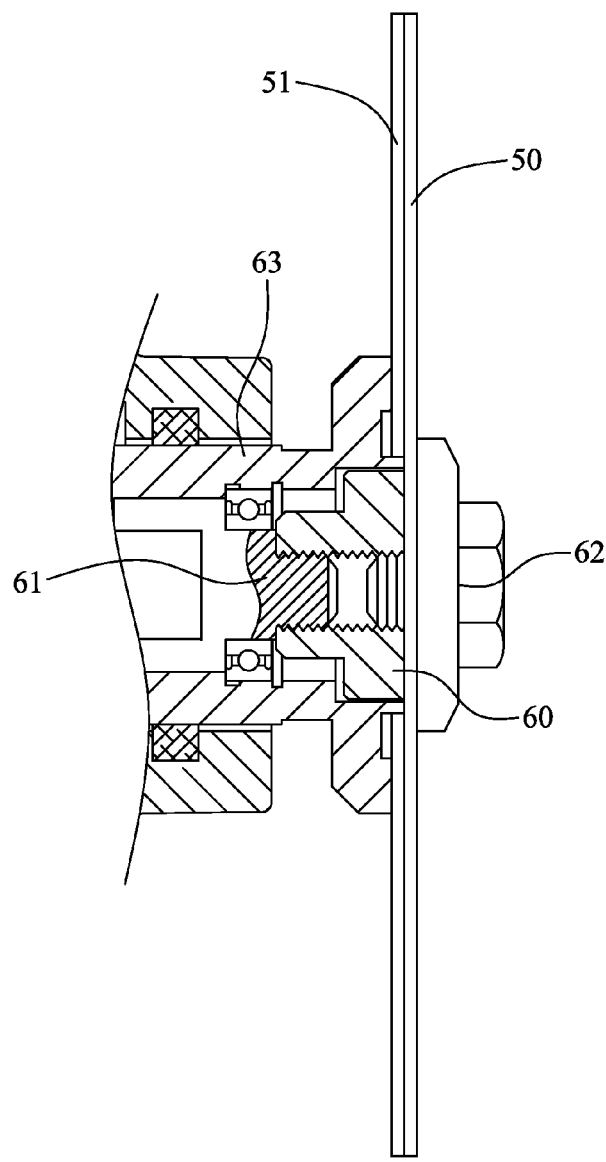
FIG. 3 is a structural view after the conventional small transmission shaft and the power output shaft are combined.
Figure 4:
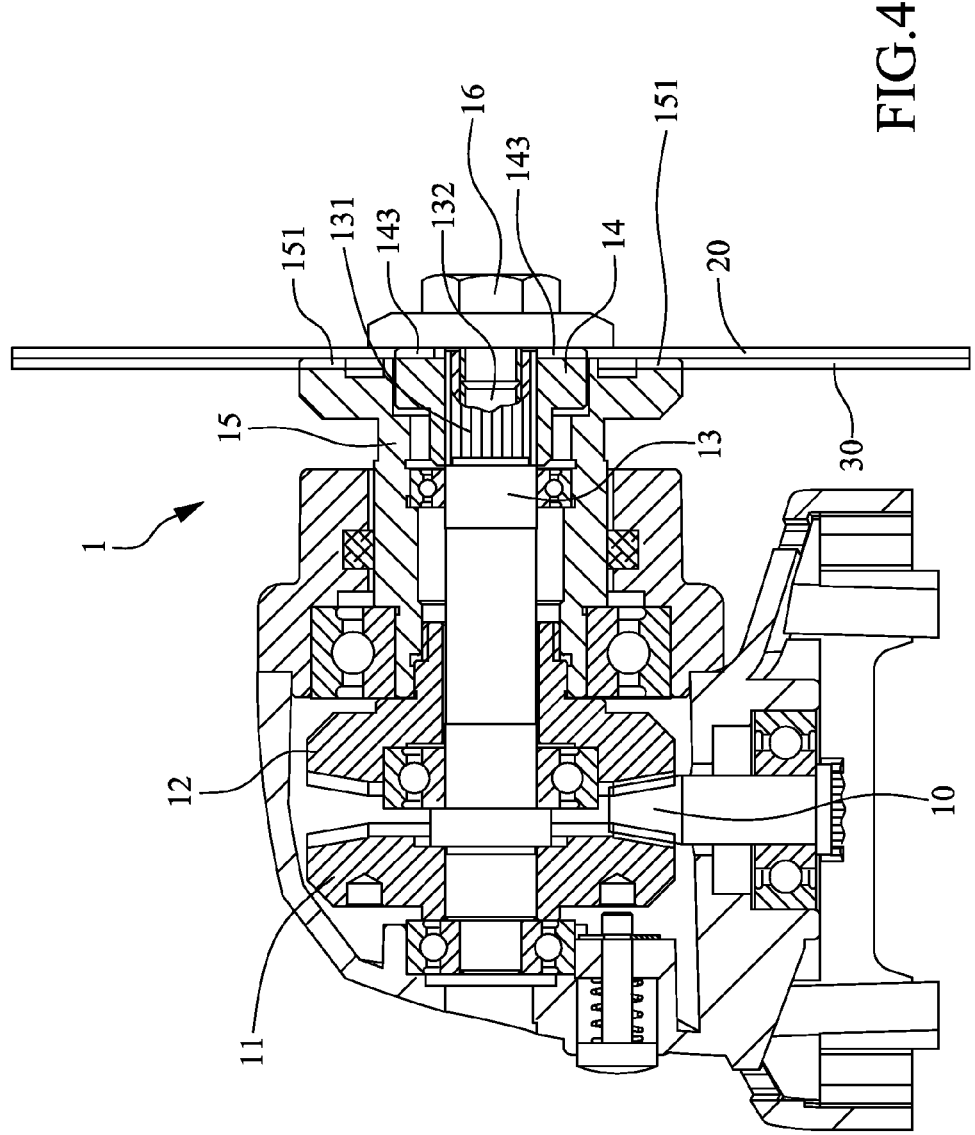
FIG. 4 is a structural view of an electric saw device of the present invention.

FIG. 4 is a structural view of an electric saw device. Referring to FIG. 4, in the electric saw device 1, two gears 11 and 12 are driven by a motor power shaft 10 to rotate at a same speed in opposite directions. The gear 11 is fixed to a power output shaft 13, the power output shaft 13 is fixed to a small transmission shaft 14, and the transmission shaft 14 drives a first saw blade 20 to rotate. The other gear 12 is fixed to a large transmission shaft 15, and the large transmission shaft 15 drives a second saw blade 30 to rotate. When the electric saw device 1 operates, the first and the second saw blades 20 and 30 rotate in opposite directions.

FIG. 5a is a front view of the first saw blade 20 according to an embodiment of the present invention, and FIG. 5b is an enlarged view of a cross section taken along 1-1 of FIG. 5a. A round rib 21 is disposed on an inner surface 25 of the first saw blade 20, and a center of the round rib 21 is a center of the first saw blade 20. Six recessed holes 22 are disposed in a top end surface of the round rib 21 at equal angle intervals, and a steel ball 23 is accommodated in each of the recessed holes 22. The steel balls 23 protrude out of the recessed holes 22. Based on the theory that three non-collinear points uniquely determines a plane, the number of the recessed holes 22 and the steel balls 23 on the first saw blade 20 should be no smaller than three. The recessed holes 22 in the rib 21 extend to a body of the first saw blade 20, so the aperture of the recessed holes 22 is relatively large for accommodating steel balls 23 with a large diameter.

Figure 6B:
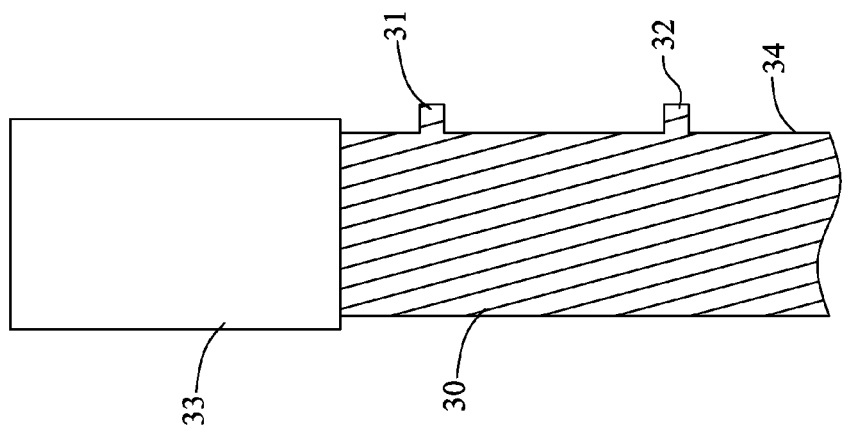
Figure 6A:
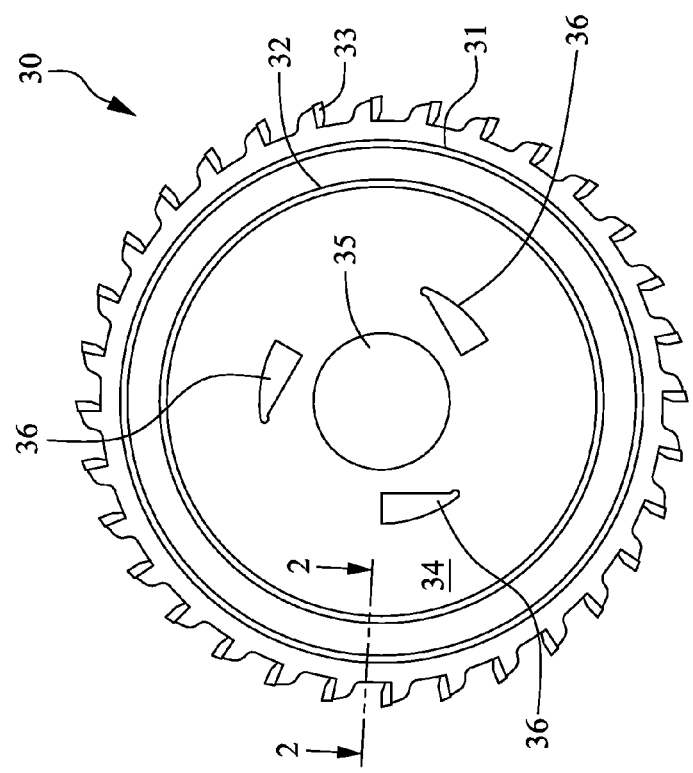
FIG. 6a is a front view of the second saw blade of FIG. 4.

FIG. 6a is a front view of the second saw blade 30 according to an embodiment of the present invention, and FIG. 6b is an enlarged view of a cross section taken along 2-2 of FIG. 6a. A first round protruding wall 31 and a second protruding wall 32 are disposed on an inner surface 34 of the second saw blade 30. An inner diameter of the first round protruding wall 31 is slightly greater than an outer diameter of the round rib 21 of the first saw blade 20, and an outer diameter of the second round protruding wall 32 is slightly smaller than an inner diameter of the round rib 21 of the first saw blade 20.

Figure 7:
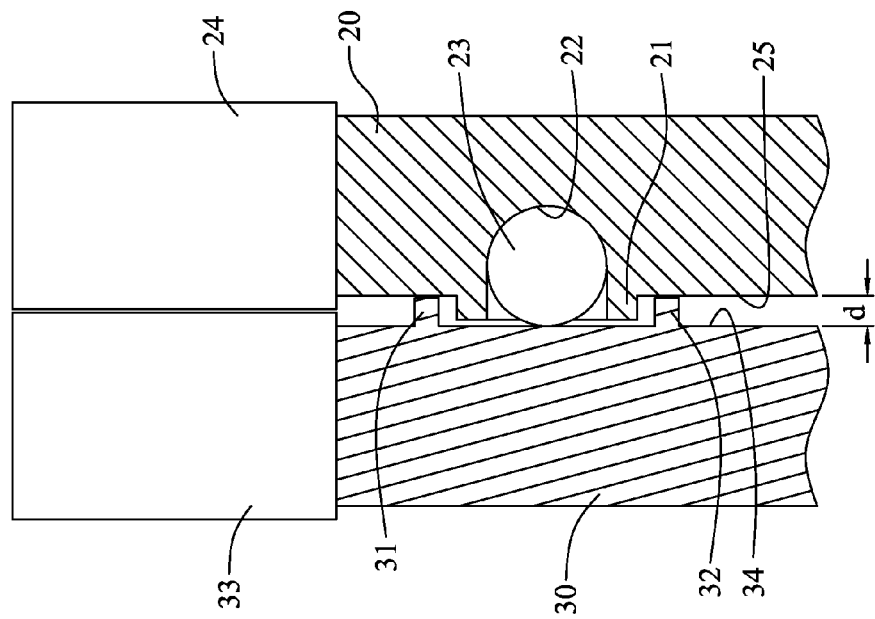
FIG. 7 is a partial enlarged view of FIG. 4.

Referring to FIGS. 4 and 7, when the second saw blade 30 and the first saw blade 20 are assembled on the electric saw device 1, protruding ends of the steel balls 23 on the first saw blade 20 that protrude out of the recessed holes 22 urge against the inner surface 34 of the second saw blade 30, so as to limit the distance between the first saw blade 20 and the second saw blade 30. The first round protruding wall 31 of the second saw blade 30 is disposed outside the round rib 21, and the second round protruding wall 32 is disposed inside the round rib 21.

A blade head 24 or saw tooth 24 of the first saw blade 20 protrudes from the inner surface 25 of the first saw blade 20 for 0.11 mm. A blade head 33 or saw tooth 33 of the second saw blade 30 protrudes from the inner surface 34 of the saw blade 30 for 0.11 mm. A distance between the blade head 24 of the first saw blade 20 and the blade head 33 of the second saw blade 30 is 0.03 mm. Therefore, the inner surface 25 of the first saw blade 20 and the inner surface 34 of the second saw blade 30 are at a distance d of 0.25 mm, and the protruding ends of the steel balls 23 and the inner surface 25 of the first saw blade 20 are at a distance of 0.25 mm. The first round protruding wall 31 and the second round protruding wall 32 on the second saw blade 30 have a height of 0.23 mm, and will not contact the first saw blade 20.

When the electric saw device 1 operates, the first saw blade 20 and the second saw blade 30 rotate in opposite directions. At this time, the contact surface between the two saw blades 20 and 30 is in a rolling contact due to the rolling of the steel balls 23, so the frictional force is small, and the temperature rise is also not great. The two saw blades 20 and 30 will not be softened because of overheat, and the steel balls 23 will not be worn easily, so the cutting precision is improved, and the life of the saw blades 20 and 30 is prolonged. If a consumer finds that the steel balls 23 are worn earlier, the steel balls 23 may be replaced. Thus, it is unnecessary to replace the entire saw blades 20 and 30, so the maintenance cost is reduced. The first round protruding wall 31 and the second round protruding wall 32 disposed on the second saw blade 30 prevent powder or small particles from entering the contact surface between the steel balls 23 and the second saw blade 30.

To ensure that the steel balls 23 do not fall off easily when accommodated in the recessed holes 22 of the first saw blade 20, the steel balls 23 are magnetic, and may be attracted on the first saw blade 20. When the first saw blade 20 is assembled on the electric saw device 1 in operation, the steel balls 23 will not fall off easily.

In the embodiment above, the round rib 21 and the steel balls 23 are disposed on the first saw blade 20, and the first protruding wall 31 and the second protruding wall 32 are disposed on the second saw blade 30, so as to realize the expected function and efficacy. In actual manufacturing, the round rib 21 and the steel balls 23 may be disposed on the second saw blade 30, and the first protruding wall 31 and the second protruding wall 32 may be disposed on the first saw blade 20, which may also realize the same function and efficacy.

Figure 8:
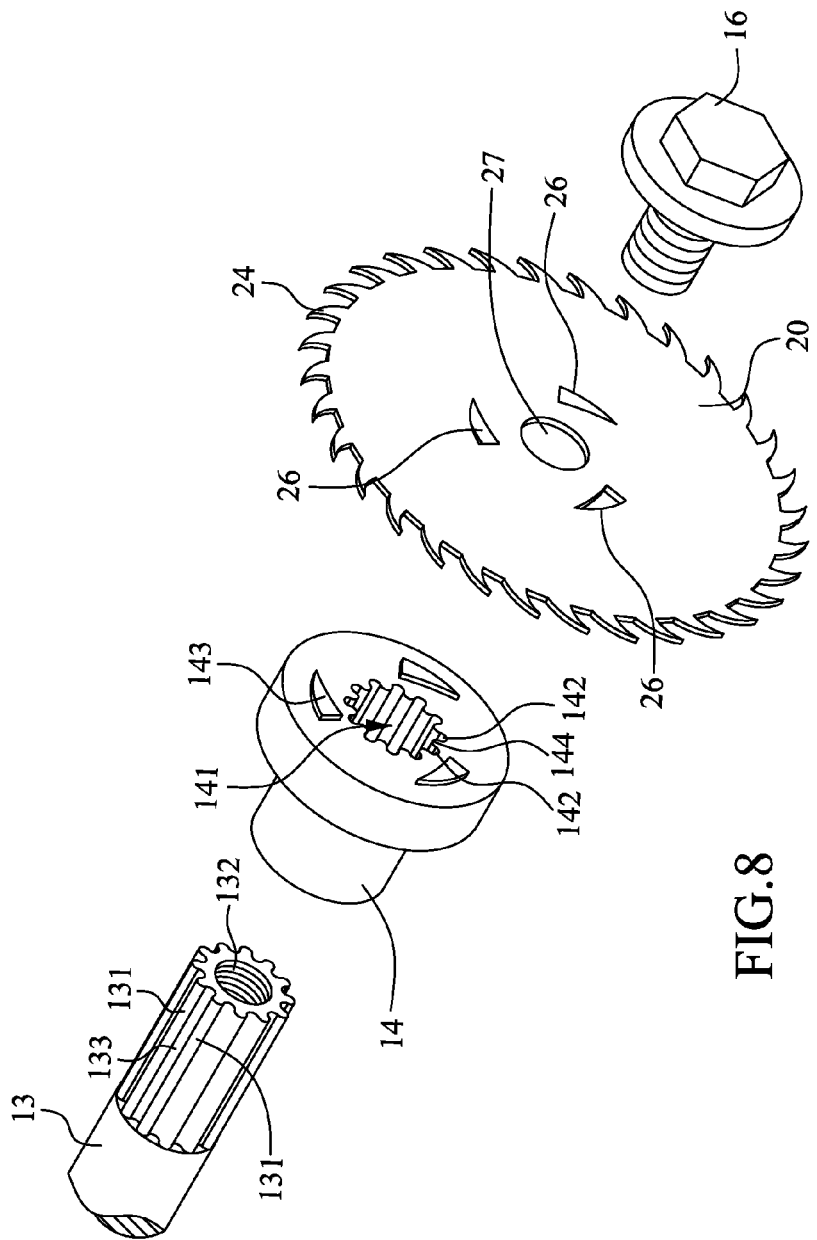
FIG. 8 is an exploded view of the small transmission shaft and the power output shaft.

Referring to FIGS. 4 and 8, a plurality of axial ribs 131 is disposed on the power output shaft 13 at a connection with the small transmission shaft 14, and an axial tapped hole 132 is disposed in a front end surface of the power output shaft 13. An axial hole 141 is disposed in the small transmission shaft 14, and a plurality of key ways 142 corresponding to the axial ribs 131 of the power output shaft 13 is disposed in an inner wall of the axial hole 141. The front end of the power output shaft 13 is inserted in the axial hole 141 of the small transmission shaft 14, and the axial ribs 131 are in tight fitting with the key ways 142 one by one. Further, a fixing screw 16 passes through the axial hole 27 in the center of the first saw blade 20, and is screwed into the tapped hole 132 in the front end surface of the power output shaft 13, so as to fix the first saw blade 20 to the small transmission shaft 14. At this point, the small transmission shaft 14 and the power output shaft 13 are aligned and fitted, such that the small transmission shaft 14 does not tilt. Further, the connection structure between the small transmission shaft 14 and the power output shaft 13 is formed by the ribs 131 and the key ways 142, so the small transmission shaft 14 and the power output shaft 13 will not get loose in high-speed rotation. At the same time as the first saw blade 20 is fixed, the second saw blade 30 is also fixed to the large transmission shaft 15. An axial hole 35 of the second saw blade 30 sleeves on the outside of the small transmission shaft 14, and is connected to the large transmission shaft 15.

Three bumps 143 are disposed on a front end surface of the small transmission shaft 13, and three through holes 26 are disposed in the first saw blade 20 correspondingly. Each of the bumps 143 passes through the corresponding through hole 26, such that the small transmission shaft 14 drives the first saw blade 20 to rotate. Three bumps 151 are disposed on a front end surface of the large transmission shaft 15 (two bumps can be seen in FIG. 4), and three through holes 36 are disposed in the second saw blade 30 correspondingly. Each of the bumps 151 passes through the corresponding through hole 36, such that the large transmission shaft 15 drives the second saw blade 30 to rotate.

As the power output shaft 13 and the small transmission shaft 14 do not tilt or become loose, the first and the second saw blades 20 and 30 will not generate sparks or damage the saw teeth of each other due to the tilt, the overload of the motor caused by jumps of the first and the second saw blades 20 and 30 are prevented, and the structure may not easily become loose.

The fixing screw 16 is directly fixed to the power output shaft 13. When the first saw blade 20 is disassembled, the small transmission shaft 14 will not fall off from the structure with the first saw blade 20, so the maintenance and parts replacement become easier. Further, the small transmission shaft 14 and the power output shaft 13 are not fixed with a super glue, so the serious problems that the conventional structure cannot be repaired and the parts of the conventional structure cannot be replaced are solved.

The axial ribs 131 of the power output shaft 13 are distributed evenly, and a key way 133 is formed between every two adjacent axial ribs 131. Further, the key ways 142 in the small transmission shaft 14 are also distributed evenly, and axial ribs 144 are disposed on two sides of each of the key ways 142. The axial ribs 144 of the small transmission shaft 14 are tightly fitted with the key ways 133 of the power output shaft 13. Therefore, on the contact surface after the power output shaft 13 is joined with the small transmission shaft 14, when the axial ribs 131 are disposed on the power output shaft 13, the key ways 142 are disposed in the small transmission shaft 14, and when the key ways 133 are disposed in the power output shaft 13, the axial ribs 144 are disposed on the small transmission shaft 14.

To sum up, in the electric saw device 1 of the present invention, the friction between the first and the second saw blades 20 and 30 is the rolling friction, and the temperature generated due to the friction may be reduced significantly, such that the two saw blades 20 and 30 are not softened because of high temperature. Thus, the cutting precision of the saw blades 20 and 30 is improved, and the life of the saw blades 20 and 30 is prolonged. Further, the key connection is used between the small transmission shaft 14 for driving the first saw blade 20 to rotate and the power transmission shaft 13, so as to ensure the saw blades 20 and 30 do not tilt after assembly nor wiggle, jump, or damage the saw teeth when the electric saw device 1 is in operation. Further, the current of the motor will not become unstable, and the overload of the motor is prevented. Thus, the service life of the electric saw device 1 is prolonged.

What is claimed is:

1. An electric saw device, comprising
a first saw blade and a second saw blade, wherein the first saw blade and the second saw blade are driven to rotate about an axis of rotation by a small transmission shaft and a large transmission shaft respectively to rotate in opposite directions, and the small transmission shaft is driven to rotate by a power output shaft;
a round rib is disposed on an inner surface of the first saw blade, the round rib is round with respect to the axis of rotation such that a center axis of the round rib is substantially coaxial with the axis of rotation, the round rib having a radial width and a top end surface;
at least three recessed holes are disposed in the top end surface of the round rib within the radial width and are disposed at equal angle intervals about to the axis of rotation; and
a steel ball in each of the recessed holes, each steel ball protruding out of the corresponding recessed hole against an inner surface of the second saw blade so as to limit a distance between the first saw blade and the second saw blade;
wherein a first round protruding wall is disposed on an inner surface of the second saw blade, the first round protruding wall is round with respect to the axis of rotation, and an inner diameter of the first round protruding wall is slightly greater than an outer diameter of the round rib by a radial distance such that the first round protruding wall is disposed outside the round rib and the radial width of the round rib is greater than the radial distance between the first round protruding wall and the round rib.

2. The electric saw device according to claim 1, wherein a second round protruding wall is further disposed on the inner surface of the second saw blade, and an outer diameter of the second round protruding wall is slightly smaller than an inner diameter of the round rib of the first saw blade such that the second round protruding wall is disposed inside the round rib.

3. The electric saw device according to claim 1, wherein the steel balls are magnetic, and are attracted onto the first saw blade.

4. The electric saw device according to claim 1, wherein an axial hole is disposed in the small transmission shaft, and a front end of the power output shaft is inserted in the axial hole; a contact surface between the power output shaft and the small transmission shaft is in a form that axial ribs are inserted in and tightly fitted with key ways; a fixing screw is screwed in a tapped hole preset in a front end surface of the power output shaft, so as to tightly fix the first saw blade to the small transmission shaft, and prevent the small transmission shaft from getting loose.

5. The electric saw device according to claim 4, wherein a first one of said axial ribs is disposed on the power output shaft, and a first one of said key ways is disposed in an inner wall of the axial hole of the small transmission shaft correspondingly.

6. The electric saw device according to claim 4, wherein a first one of said axial ribs is disposed in an inner wall of the axial hole of the small transmission shaft, and a first one of said key ways is disposed on the power output shaft correspondingly.

* * * * *